(12) United States Patent
Igarashi

(10) Patent No.: US 8,448,379 B2
(45) Date of Patent: May 28, 2013

(54) PURE-GROWN TOTALLY CONCEALED CLEAN ROOM VEGETABLE FACTORY

(76) Inventor: Larry Y Igarashi, Coto De Caza, CA (US)

(*) Notice: Subject to any disclaimer, the term of this patent is extended or adjusted under 35 U.S.C. 154(b) by 227 days.

(21) Appl. No.: 13/033,812

(22) Filed: Feb. 24, 2011

(65) Prior Publication Data

US 2012/0144740 A1    Jun. 14, 2012

Related U.S. Application Data

(60) Provisional application No. 61/421,411, filed on Dec. 9, 2010.

(51) Int. Cl.
*A01G 31/00* (2006.01)

(52) U.S. Cl.
USPC ............................................. 47/62 R

(58) Field of Classification Search
CPC ............................................. A01G 31/00
USPC ............... 47/60, 62 R, 62 N, 62 A, 62 C, 17, 47/65.5, 66.7, 41.12, 46, 79
See application file for complete search history.

(56) References Cited

U.S. PATENT DOCUMENTS

| | | | | |
|---|---|---|---|---|
| 2,674,828 A * | 4/1954 | Tegner | | 47/62 R |
| 3,660,933 A * | 5/1972 | Wong, Jr. | | 47/62 C |
| 4,255,896 A * | 3/1981 | Carl | | 47/62 C |
| 4,513,531 A * | 4/1985 | Lestraden | | 47/39 |
| 4,514,930 A * | 5/1985 | Schorr et al. | | 47/60 |
| 4,967,645 A * | 11/1990 | Mattson | | 454/296 |
| 5,117,581 A * | 6/1992 | Green et al. | | 47/18 |
| 5,212,906 A * | 5/1993 | Okuno et al. | | 47/62 N |
| 6,088,958 A * | 7/2000 | Oka et al. | | 47/58.1 R |
| 7,472,513 B2 * | 1/2009 | Bula | | 47/89 |
| 8,065,833 B2 * | 11/2011 | Triantos | | 47/62 R |
| 2009/0031621 A1 * | 2/2009 | Kitagawa | | 47/17 |

* cited by examiner

*Primary Examiner* — Rob Swiatek
*Assistant Examiner* — Ebony Evans
(74) *Attorney, Agent, or Firm* — Steven A. Nielsen; Allman & Nielsen

(57) ABSTRACT

Plant roots are moved by various means and sometimes exposed to air within a clean room system of plant production. A tub and lid system of plant containment and plant care may be integrated into a rack system which may be contained within a clean room environment devoid of bugs, environmental deviations, pollution and other contaminates found in a typical organic system of the prior art.

9 Claims, 7 Drawing Sheets

PURE-GROWN TOTALLY CONCEALED CLEAN ROOM VEGETABLE FACTORY

CROSS-REFERENCE TO RELATED APPLICATIONS

This is a utility application based upon U.S. patent application Ser. No. 61/421,411 filed on Dec. 9, 2010. This related application is incorporated herein by reference and made a part of this application. If any conflict arises between the disclosure of the invention in this utility application and that in the related provisional patent application, the disclosure in this utility application shall govern. Moreover, the inventor incorporates herein by reference any and all patents, patent applications and other documents, hard copy or electronic, cited or referred to in this application.

COPYRIGHT AND TRADEMARK NOTICE

This application may include material which is subject or may be subject to copyright or trademark protection. The copyright and trademark owner has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to agricultural systems. More particularly, the invention relates to means and methods of growing items within a clean room.

(2) Description of the Related Art

Greenhouse hydroponic methods and machinery are known in the related art. Greenhouse hydroponic systems have several shortfalls, such as solar gain from sunlight, causing a need for large scale ventilation systems with open roofs. The heightened need for ventilation and an open roof invites air pollution, insects, worms, insect eggs, spider webs, animal contamination, dust, bacteria, diseases and other undesirable elements coming into contact with the growing produce.

While generally unknown to the public, traditional hydroponic systems are easily and often contaminated by workers who eschew uncomfortable overall protective suits, gloves or masks. This lapse in rudimentary sanitation is understandable as traditional hydroponic growing systems fail to follow or even acknowledge clean room sanitation standards. The ventilation needs of hydroponic systems bring in so much undesirable material that workers fail to even consider their own unsanitary contributions to a hydroponic system.

Traditional organic growing purports to refrain from the use of chemical pesticides and chemical fertilizer but makes no attempt to limit exposure to outdoor natural elements such as manure, insects, bacteria, dirt and other unsavory additions to the growing produce. Organic growing systems are now known as major contributors to outbreaks of *E-coli*, salmonella outbreaks and produce recalls.

BRIEF SUMMARY OF THE INVENTION

The present invention overcomes shortfalls in the related art by presenting an unobvious and unique combination and configuration of building structures, stacking of grow sub straights or grow beds, moving clean rooms, clean room protocols, control of nearly all interior variables, air bath rooms, air filtering, nutrient water, water sterilizing system and other components and methods.

One of the main advantages of this invention is that natural outdoor variables such as temperature, drought, storm, bacteria, fungus, rainfall, wind, frost, humidity, animal and insect contact are removed from the growing process. In certain embodiments of the invention, a grow room is disclosed wherein grow room conditions allow for a totally sterilized and insulated growing environment maintaining a constant temperature, moisture, $CO_2$ level, lighting strength and hours, schedule and other elements resulting in unexpectedly good results.

Unexpected results of various embodiments of the invention include, an extremely rapid harvesting cycle not seen in the related art. In one embodiment, the invention has produced 12 to 15 harvests a year as compared to the 3 to 5 harvests per year found in the related art. Other unexpected results include cost savings in production and exceptional purity in grown produce.

In another aspect of the various embodiments of the invention, a mobile clean room is disclosed and may be used for the long range transport of clean grow produce.

These and other objects and advantages will be made apparent when considering the following detailed specification when taken in conjunction with the drawings.

Figure 1:
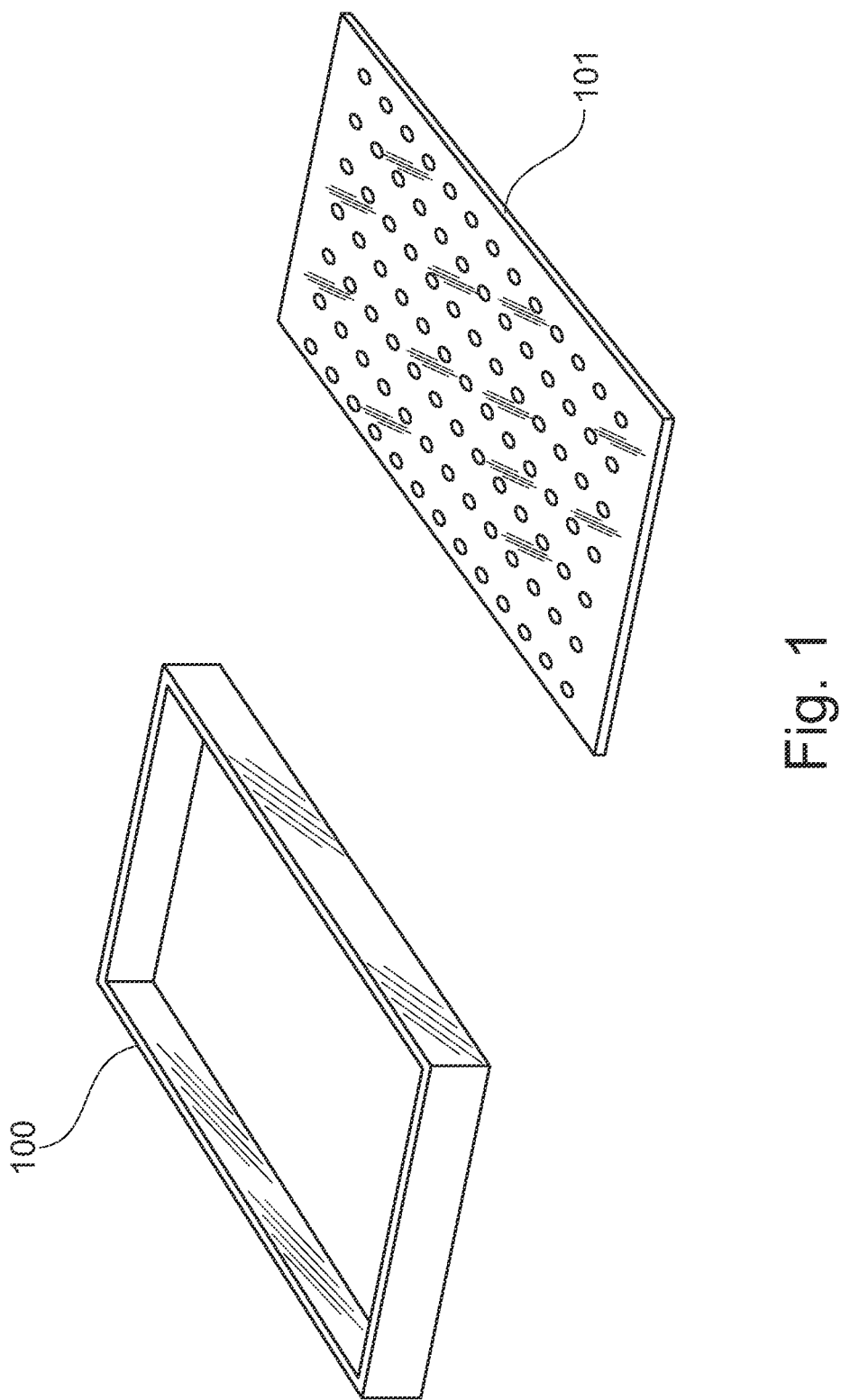
FIG. 1 is a perspective view of a grow lining and a grow tray

REFERENCE NUMERALS IN THE DRAWINGS 100 a grow lining or grow tub
101 a grow lid
200 a racking system
201 lights such as LED and florescent
202 side reflector to contain light inspection
203 pipe system to deliver in-fill nutrient water from main tank, sometimes referred to as an inflow pipe system
204 over-flow return pipes
205 overflow drain with a "B" section for sometimes containing nutrient water within tub and with an "A" section to sometimes drain nutrient water within the upper level of a tub
300 growing produce
301 roots
400 a racking system with growing produce
500 air
501 nutrient water
600 one embodiment of a disclosed clean room for growing plants
601 sticky mats used to remove foreign matter from shoes
602 air shower room
603 clothes change room
604 offices
605 packing, preparation, shipping and receiving room

606 storage and equipment room
607 tank and circulation room
608 germination room
609 grow bed racks

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms Grow Cubes Grow cubes or cubes are configured in many different materials and sizes. A preferred embodiment comprises dimensions of 1×1×1" or 1×1×1.5" (height) and comprises materials such as urethane foam (both soft and hard types), rock wool, and PET fiber.

One embodiment includes a 10×20" flat with precut lines of the sizes disclosed above with one hole on top for each cube to receive seeds. After seeds are dropped in each cube hole, the flat in placed within a germination tray with nutrient water filled. Depending on species of vegetables and herbs, the trays are kept in a germination room with or without lighting for 2-5 days depending upon the species occupying the cube. As soon as sprouts grow to 2 leaves (usually 0.5-1.5" high), each cube is transplanted to the grow tub lid hole of 1-1.5" diameter. These cubes absorb the nutrient water from the bottom to the top and keep the seeds and sprout's roots wet. To harvest the vegetables, the cubes are removed from the grow tub and placed within a disclosed individual container, named and sometimes called a "Moving Clean-Room".

Moving Clean Room

A container, sometimes referred to the "Moving Clean Room" may comprise a bottom tray comprising Polystyrene (OPS), Polyethylene (LDPE=low density polyethylene) or other materials with white or black color to prevent light from reaching the vegetables or other contents. Clear top cover, "O'-Cello Fresh #8-12" film made by O'-Cello Co., Ltd. in Aichi Prefecture, Japan is attached to the bottom by Tray Lidding method. This O'-Cello Fresh #8-12" film allows unwanted Ethylene gas produced by the contained produce to vent out of the package. The retention of Ethylene gas or vapor may increase and accelerate the decomposition of the contained produce. The disclosed seal systems prevent exterior elements from entering the package.

Pure-Grown vegetables are contained in "Moving Clean-Room" container with or without their roots and the original germination cube withholding the nutrient water with "O-Cello Fresh" film on top to let Ethylene gas escape out of the container as described above. Humidity and/or growing nutrient remain inside the container, and the vegetables continue growing and remain fresh during transport. Upon arrival at a retail establishment the moving clean room container may be displayed on the retailers' shelves and stored in refrigerators for an increased shelf life. In an alternative embodiment, another film "Peekfresh" made by Peakfesh USA, Anaheim, Calif., absorbs ethylene gas by the coated material inside of the film.

Grow Room Structures

Grow beds are positioned on the stacked up metal racks with individual lighting sources directly above and nutrient water filled. Nutrient water is to be circulated from the central tank by pumps after filtered and adjusted with perfectly desired nutrient ingredients and after sterilized bacteria, diseases, fungus, etc. by UV sterilizer system.

Unexpected Results with Grow Times and Cycles

Embodiments of the disclosed invention have produced unexpected results in time needed for germination, sprout growth and full growth. For example, for various species of lettuce, a germination period of 2 to 3 days, a spout period of 2 to 3 days and full growth period of 2.5 to 3 weeks were obtained.

Accommodations for Necessary Root Movement

Vegetables, produce and other grown food stuffs achieve better grow rates and results when their roots move (exercise) during the growing process. In one embodiment, the disclosed invention achieves a natural root movement/exercise by applying nutrient water from one side of a grow bed and then allowing an overflow of water through an opposite side of the grow bed. Thus, the disclosed invention achieves root movement without the use of mechanical equipment.

Oxygen Supply

Figure 7:
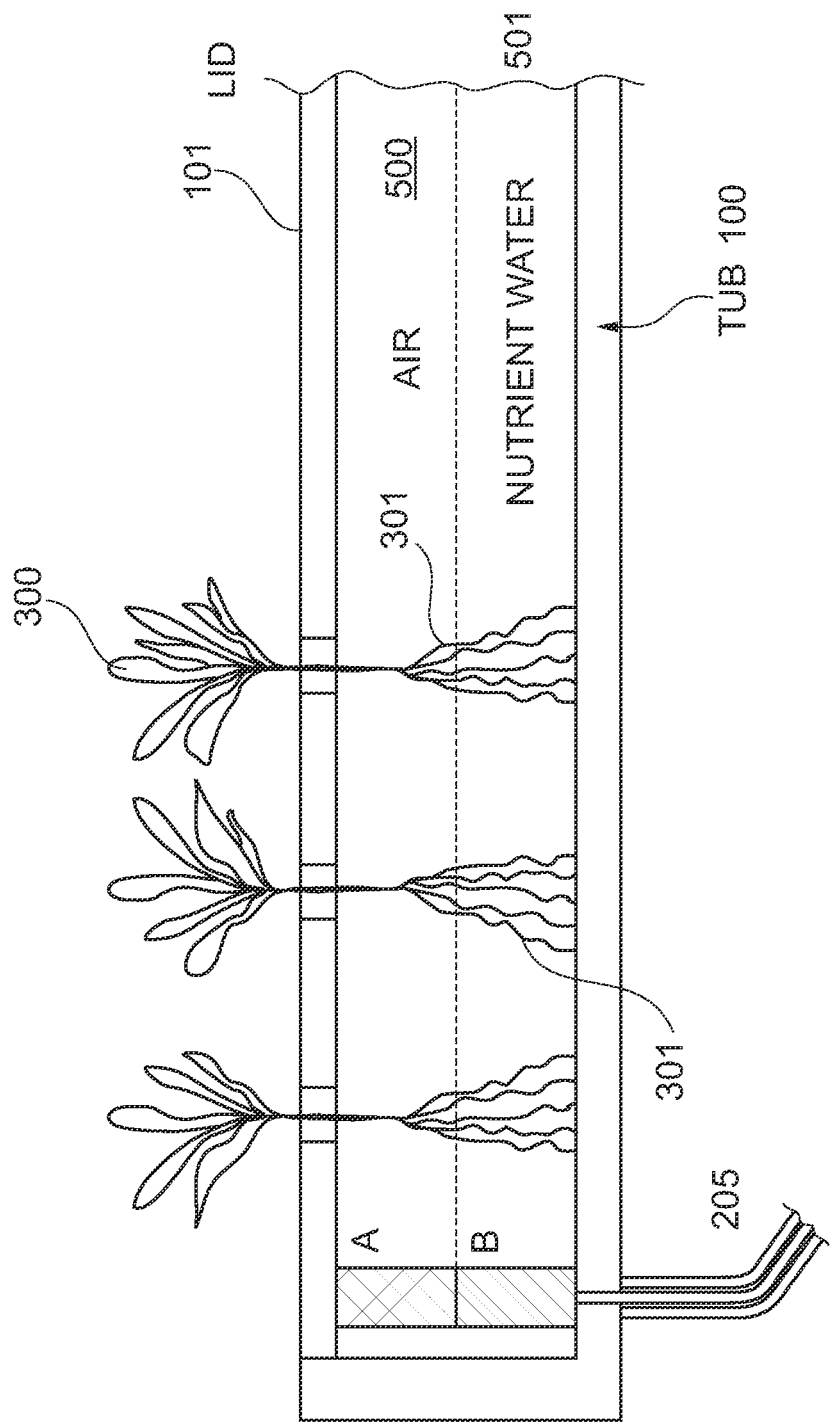
FIG. 7 is a sectional view of plants with roots exposed to air and nutrient water.

In addition to root movement, embodiments of the invention include means and methods of exposing roots to ambient air to achieve unexpected results in outstanding plant growth and plant health. By use of alternative drains and water levels, roots may be moved and exposed to air. One such contemplated embodiment is shown in FIG. 7 wherein an overflow drain comprises an A level and a B level to expose roots 301 to air 500 or nutrient water 501. In one contemplated embodiment, an overflow drain 205 sits within a tub 100 and below a lid 101, with plant roots 301 within a tub 100 and plants 300 growing above a lid 101.

Nutrient Water Composition and Circulation

One embodiment of a disclosed reservoir tank contains flawlessly mixed nutrients found to be exceptionally effective for vegetable growth. The nutrient water has a preferred embodiment comprising a state of EC 1.3 to 2.5 and a PH of 5 to 8. Obtaining such optimal mixtures may be accomplished manually or automatically by sensors and computer analysis. Nutrient water is pumped and fill the top of grow tub on each row and drop down to the next lower grow tub level by the overflow drain and down to the next lower level and pumped back to the reservoir tank. Or, each tub may have a drain going back directly to the tank without dropping down to the next lower tub. One embodiment of the disclosed tank contains a filter to clean the water before the water back travels out to the top of the grow tub again.

Nutrient Composition

The embodiments of the disclosed system uses various compositions of nutrients. The best mode known to date is as follows:

| | |
|---|---|
| Nitrogen = N | 4-10% |
| Phosphoric Acid = P2O5 | 8-14% |
| Potash = K2O | 27-34% |
| Magnesium = Mg | 3-4% | and trace elements of Boron=B, Copper=Cu, Iron=Fe, Manganese=Mn, Zinc=Zn, Molybdenum=Mo with supplemental Calcium Nitrate and Potassium Nitrate.

No bacteria or fungi is used as in an organic grow method. Manure, sea kelp, fish powder, compost and other such unclean materials that contaminate a system are not used in the present system. Such unclean materials are typically used in organic systems.

Optimal Interior Environment

In the best mode known to date, the following environmental values are used:

Temperature: 18-25 degrees C.

Humidity: 45-70%

Lighting Source: 100-200 PPFD (Photosynthesis Photon Flux Density)

CO2: ½-15 SCFH (Standard Cubic Feet per Hour)

Clean Growing Room Environment

One embodiment of the disclosed clean room or grow room comprises a completely concealed clean room. The entire structure is carefully and precisely constructed so as to not have any voids, holes, or slits to allow the introduction of insects, raw exterior air, or bacteria. The sealed construction encompasses all areas of construction from floor to ceiling and to all walls. All ceilings and walls may be covered by 1-1.5" thick 1-2 lbs Stylo-foam sheets to maintain a desirable temperature, humidity, CO-2 and lighting intensity.

Persons entering the disclosed grow room pass through an air shower room to dust off all foreign matter and them move to the changing room to change cloths. In the changing room, street clothes are removed and replaced with an overall uniform of at least 10,000 units protection level. Before entering a grow area, a worker must wash their hands with sterilizing gel and wear a respiratory mask and surgical gloves. Embodiments of the air shower room, and clothes change room and clean-room have sticky mats where all foreign particles and dust and debris are removed from shoes and booties.

Other Benefits of Embodiments of the Disclosed Invention

Other benefits and/or unexpected results of embodiments of the disclosed invention include:

1) Very rapid harvesting cycle, 12-15 harvestings per year depending on species and kinds of produce and flowers. Conventional open field and organic agriculture methods can have only 3-5 harvesting per year, rapid, cost saving production. No price fluctuation. Precisely planned scheduling from seeding to harvesting.

2) No influence by Mother Nature. Sun, frost, storm, wind, rain, drought, temperature, snow, etc. do not affect Pure-grown agriculture technology, rapid, cost saving production. No price fluctuation. Precisely planned scheduling from seeding to harvesting.

3) Cleanest and Safest produce without chemical pesticides and fertilizers, existence of insect/bugs themselves and eggs and warms, damages from insects/bugs, bacteria, pollution contaminations, human contaminations, animal contaminations. Safe foods for humans.

4) Location and season advantages: Pure-grown factory can be built in the middle of Manhattan, Los Angeles or Anchorage, Alaska on any floor in any building structure. Pure-grown produce and flower can be produced 365 days an year regardless of seasons whether it is 110 degrees summer or −20 degrees freezing winter. Fresh and cost saving produce can be delivered to grocery stores and restaurants in the middle of snowing season under daily basis in most fresh condition harvested right from the factory. (Most of produce is shipped from Southern states such as Florida, Texas, and California and even from Mexico to snow countries during snow season spending expensive trucking charges and many days. Produce is already in wilting condition when they arrive in snow countries.

5) Cost saving: Produce by All traditional agricultures such as Open Field conventional method, Organics method, and Green house Hydroponic method has high waste factor like 20-50% due to damaged parts and contaminated parts. Pure-grown produce is to be shipped in its original grow condition with/or without roots and seeding bed cube without any damage and contamination in totally concealed package which removes Ethylene gas (expedites produce to go bad) and does not let any outside substance come inside, there will be no damage or waste factor. Users of Pure-grown produce can save the 20-50% wasted portion like other produce agriculture method.

Alternative Version of Concealed Clean Room

Another contemplated embodiment includes a smaller version of the disclosed clean room which may be constructed within shipping containers of various sizes, including 20×20× 8' and 20×40×8'. Clean rooms built into or integrated with such shipping containers may be moved to open fields, deserts, show cases, restaurants and other locations.

Another contemplated embodiment includes a case or glass display unit containing a scaled down version or smaller version of the disclosed clean room vegetable factory. Such an embodiment may be installed within restaurants or other locations.

Alternative Compositions for Constructing Grow Beds

The disclosed grow beds may be constructed out of styro-foam and other materials such as ABS and FRP (Fiber Reinforced Plastic).

FIG. 1 shows a grow lining or grow tub 100 adjacent to a grow lid 100. Contemplated materials for either components of FIG. 1 include styro-foam, ABS, FRP (Fiber Reinforced Plastic. A grow tub 100 and fitting 101 lid may be of any dimensions. In the best mode known to date, the grow tub has a depth of four to six inches.

Figure 2:
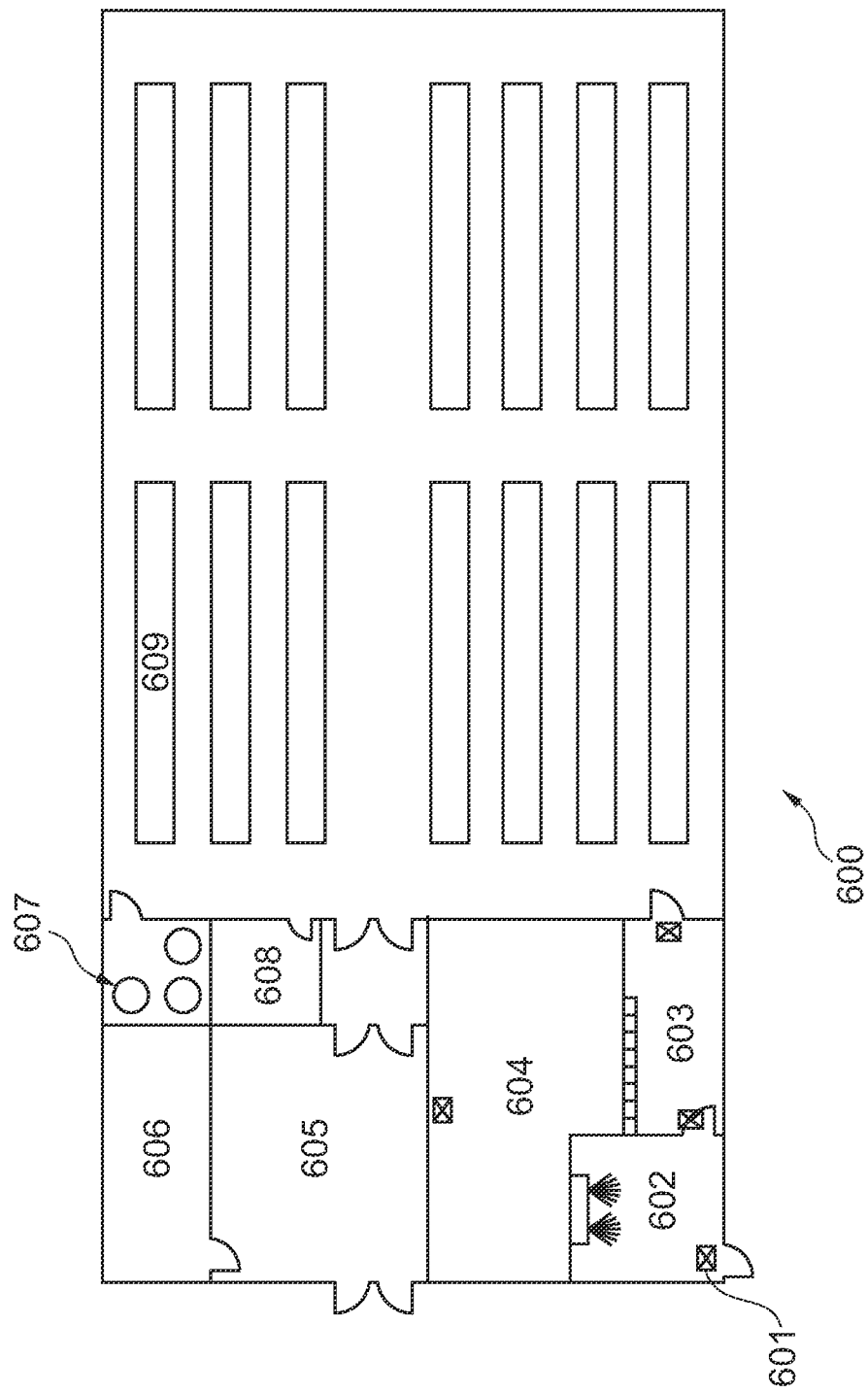
FIG. 2 is a plan view of one embodiment of a concealed clean room

FIG. 2 shows a plan view of one contemplated embodiment of a plant factory 600. Rows of grow bed racks 609 are shown in a main grow area. Ancillary structures may include a storage and equipment room 606, tanks and circulation room 607, germination room 608, offices 604, room for changing attire 603, packing, preparation, shipping and receiving room 605, sticky mats 601 found at the entrance of an air shower room 602.

Figure 3:
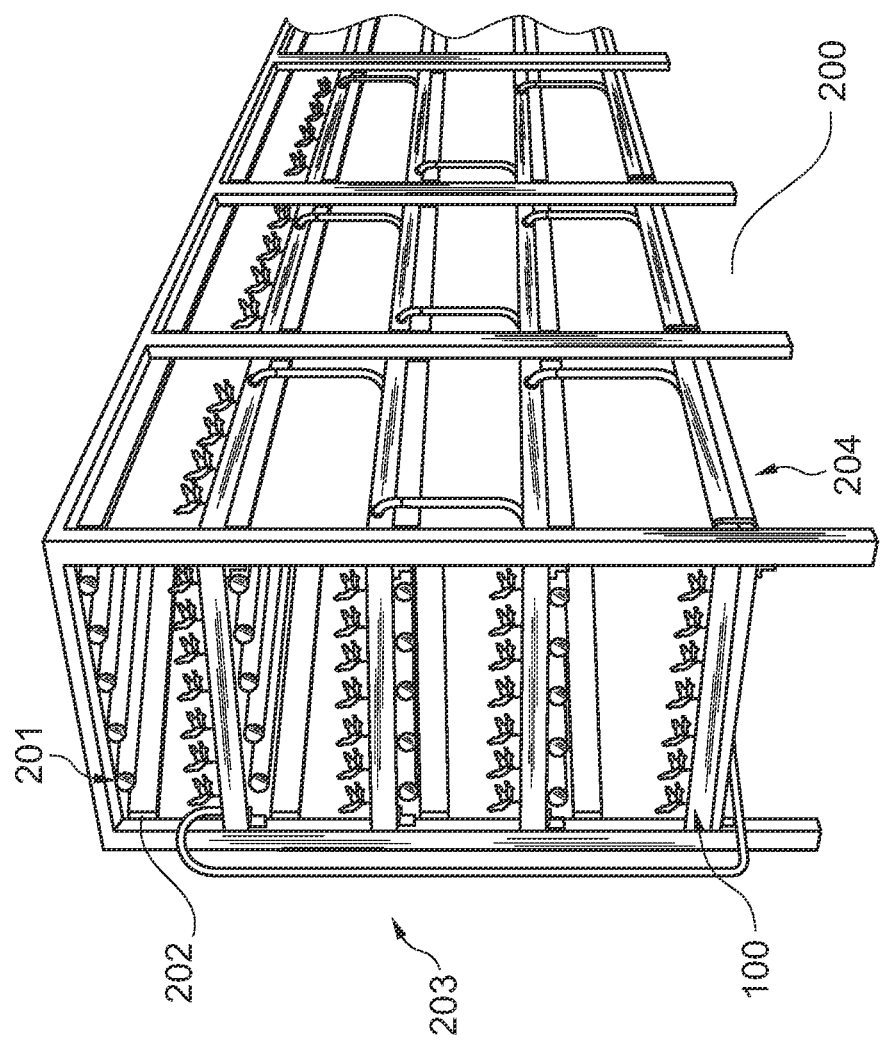
FIG. 3 is a perspective view of one embodiment of a racking system

FIG. 3 shows a contemplated embodiment of a racking system 200 used to grow plants upon multiple levels. Each grow compartment may comprise a grow lining or grow tub 100, a side reflector 202, and lights 201 such as LEDs or florescent. A rack system may have a pipe system 203 to deliver in-fill nutrient water from a main tank or circulation system. A rack system may also have a system of overflow drains 205.

In one embodiment, a side reflector 202 may include a four inch high and ¾ to an inch thick stylofoam strip used to avoid light escape and to reflect light back toward the inside of the grow tub area. The side reflector strip may be installed along the sideway of the light tube with 20 to 30 degrees of taper toward the outside of the grow bed. This method produces very effective results. Such reflection can also be accomplished by a fluorescent light troffer (fixture) making its two sides parallel to the fluorescent tubes deeper, to about 3.5 to 4 inches in depth.

Figure 4:
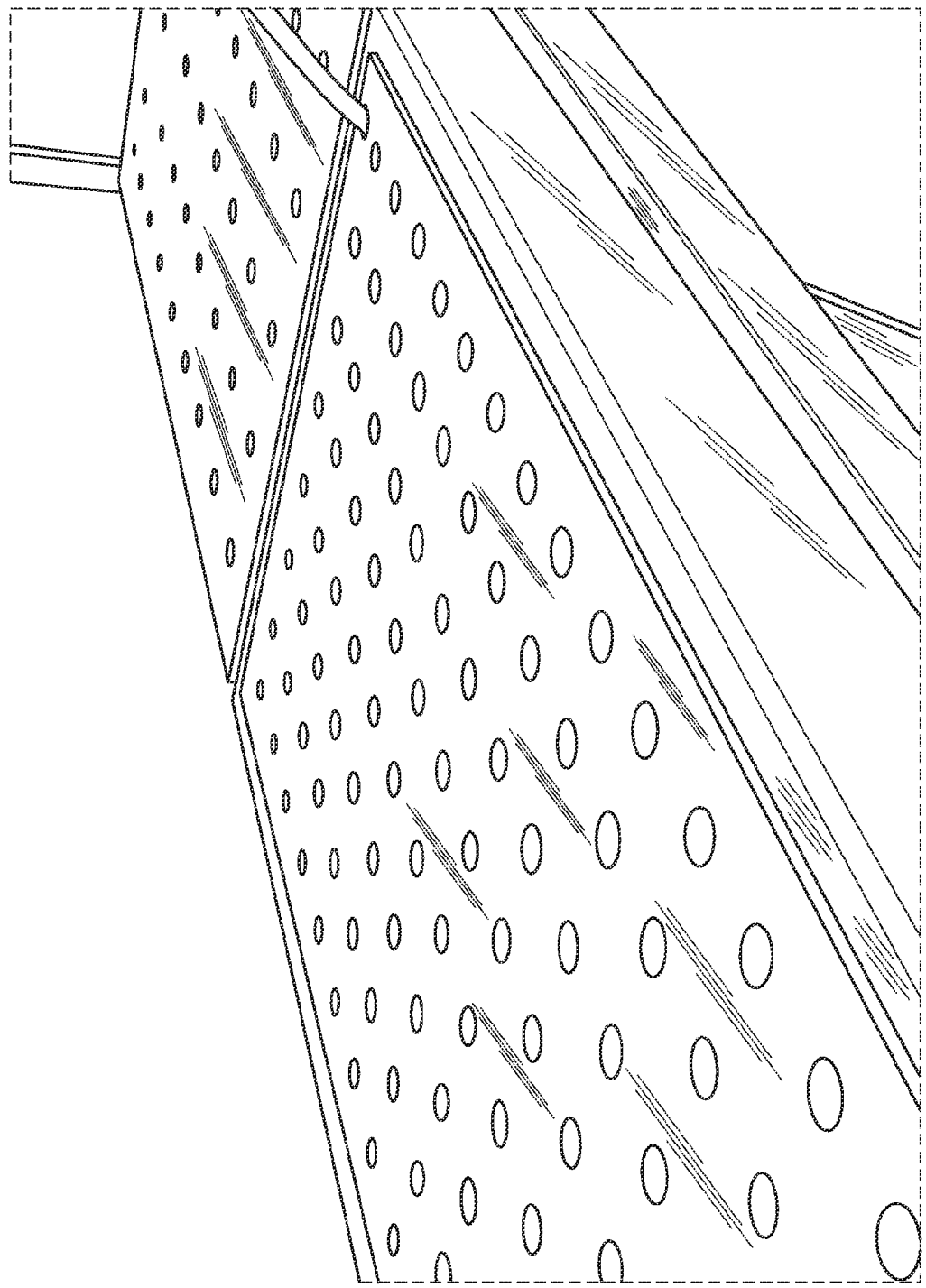
FIG. 4 is a perspective view of one embodiment of a grow tray

FIG. 4 shows one embodiment of a contemplated grow lid 101 placed within a grow tub 100.

Figure 5:
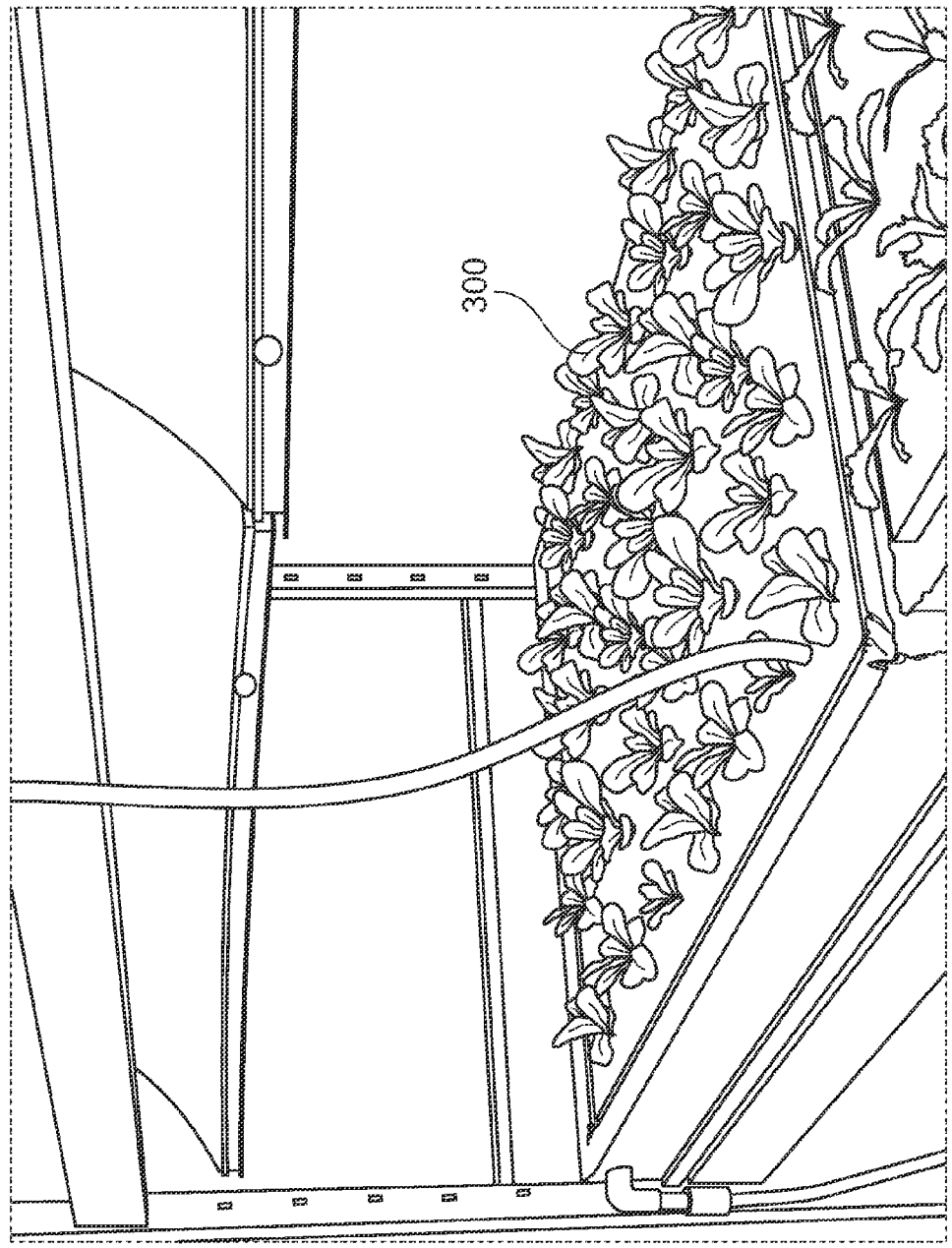
FIG. 5 is a perspective view of one embodiment of a grow tray with growing produce

FIG. 5 shows a contemplated grow tub, grow lid with plants 300 growing out of 11d voids.

Figure 6:
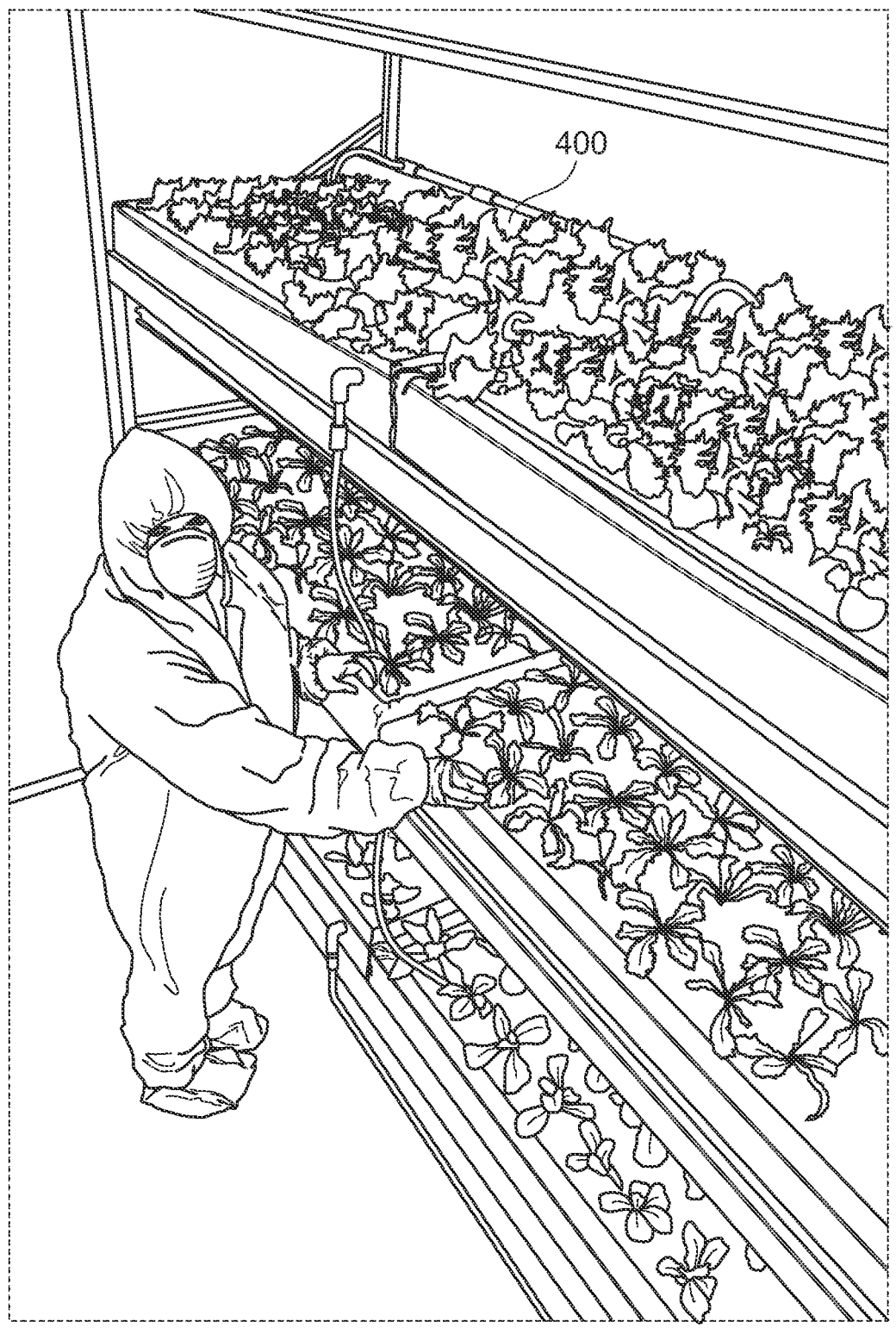
FIG. 6 is a perspective view of one embodiment of a stacked section of grow trays.

FIG. 6 shows a worker wearing a clean suit and tending to plants growing within a rack system 400. The worker's clean suit comprises, gloves, booties, face mask, hoodie and overalls.

FIG. 7 is a sectional view of one embodiment of a changeable overflow drain height system. Both root movement and root air exposure may be obtained by alternating uses of part A and part B of overflow drain system 205. At the A level, nutrient water 501 reaches the bottom portion of the grow lid 101. At the B level, air reaches the roots 301 and nutrient water 501 reaches the lower portions of the roots 301.

Contemplated embodiments include a continuous tub of approximately 30 to 50 feet as opposed to four foot individual tubs. An advantage of a continuous long tub is that only one fill pipe is needed at an end section and only one overflow drain system is needed per long tub.

Contemplated embodiments include, but are not limited to the following items, and items defined herein do not limit the definitions of claims terms.

Item 1. A contained growing system, the system comprising:
a) a grow tub lining 100;
b) a grow lid 101 covering the grow tub, and the grow lid having a plurality of voids, the voids suitable for allowing plant life to grow through the voids;
c) a racking structure 200, with the rack structure having a side reflector 202 providing means of inspecting lights;
d) a light system 201
e) a drain pipe system 205 with "B" section for sometimes containing nutrient water within tub and with an "A" section to sometimes drain nutrient water within the upper level of a tub,
f) an inflow pipe system 203 sometimes delivering water containing nutrients; and
g) the drain pipe system and the inflow pipe system capable of filling the grow tub lining with water containing nutrients and draining the grow tub to levels causing plants roots to be exposed to air 500 and causing plant roots to move within the grow tub.

Item 2. The contained growing system of item 1 wherein a grow tub lining comprises a continuous tub structure.

Item 3. A growing system, the system comprising:
a) a plurality of racking systems 400;
b) a plurality of grow tubs 100 fitted with grow lids 101, with each grow lid having voids sufficient for allowing plant life to grow through the voids;
c) a pipe system 203 delivering water to the plurality of grow tubs;
d) an overflow drain system 205 comprising a lower drain block "B" and an upper drain block "A", with the upper drain block "A" placed on top of the lower drain block "B", such that roots 301 contained within the grow tub 100 are sometimes exposed to air upon use of upper drain block "A" and that use of upper drain block "A" causes roots 301 to move within the tub 100;
e) a lighting system 201 providing artificial light to one or more of the grow tubs;
f) a filtration system filtering drained water and returning water for delivery to the grow tubs; and
g) a side reflector system 202, contained within the racking systems 400, the light reflector system allowing visual inspection of lighting components.

Item 4. The growing system of item 3 contained within a closed structure, the closed structure comprising:
a) a germination room 608;
b) a tank and circulation room 607; and
c) an air shower room 602 having sticky mats 601.

Item 5. The growing system and closed structure of item 4 within the closed structure is to be a mobile structure capable of being towed or shipped as a shipping container.

Item 6. A method of growing plants, the method comprising:
a) using a plurality of racking systems 400;
b) using a plurality of grow tubs 100 fitted with grow lids 101, with each grow lid having voids sufficient for allowing plant life to grow through the voids;
c) using a pipe system 203 deliver water to the plurality of grow tubs;
d) using an overflow drain system 205 comprising a lower drain block "B" and an upper drain block "A", with the upper drain block "A" placed on top of the lower drain block "B", such that roots 301 contained within the grow tub 100 are sometimes exposed to air upon use of upper drain block "A" and that use of upper drain block "A" causes roots 301 to move within the tub 100;
e) using a lighting system 201 providing artificial light to one or more of the grow tubs;
f) using a filtration system filtering drained water and returning water for delivery to the grow tubs; and
g) using a side reflector system 202, contained within the racking systems 400, the light reflector system allowing visual inspection of lighting components.

Item 7. The method of item 6 using a closed structure to protect plants from outside elements.

Item 8. The method of item 7 using an air shower to clean people who maintain the growing plants.

Item 9. The method of item 8 using clean suits to clothe people who maintain the growing plants.

What is claimed is:

1. A contained growing system, for moving plant roots and varying the levels of fluid in contact with the plant roots, the system comprising:
   a) a grow tub lining;
   b) a grow lid covering the grow tub lining, and the grow lid having a plurality of voids, the voids suitable for allowing plant life to grow through the voids;
   c) a racking structure, the racking structure having a side reflector providing means of inspecting lights;
   d) a light system;
   e) a drain pipe system disposed within the grow tub lining, the drain pipe system comprising a lower "B" section configured to drain nutrient water from a lower level of the grow tub lining and the drain pipe system further comprising an upper "A" section configured to drain nutrient water contained within an upper level of the grow tub lining;
   f) an inflow pipe system disposed within the grow tub lining and configured to deliver water containing nutrients into the grow tub lining; and
   g) the drain pipe system and the inflow pipe system configured to fill and drain the grow tub lining with water containing nutrients to cause plant roots disposed within the grow tub lining to move and to expose said plant roots to air.

2. The system of claim 1 wherein the grow tub lining comprises a continuous tub structure.

3. A contained growing system, using a drain and inflow system to move plant roots and to expose plant roots to air, the system comprising:
   a) a plurality of racking systems;
   b) a plurality of grow tub liners fitted with grow lids, with each grow lid having voids sufficient for allowing plant life to grow through the voids of each grow lid;
   c) a pipe system delivering water to the plurality of grow tub liners;
   d) an overflow drain system comprising a lower drain area section and an upper drain area section, with the upper drain area section superior to the lower drain section, such that plant roots contained within the grow tub liners are exposed to air upon use of upper drain section and that use of the upper drain section causes plant roots to move within the grow tub liners;
   e) a lighting system providing artificial light to one or more of the grow tub liners;
   f) a filtration system filtering drained water and returning water for delivery to the grow tub liners; and
   g) a side reflector system, contained within the racking systems, the light reflector system allowing visual inspection of lighting components.

4. The system of claim 3 contained within a closed structure, the closed structure comprising:
   a) a germination room;
   b) a tank and circulation room; and
   c) an air shower room having sticky mats.

5. The system of claim 4 wherein the closed structure comprises a mobile structure capable of being transported as a shipping container.

6. A method of growing plants by moving plant roots and exposing the plant roots to air the method comprising:
   a) using a plurality of racking systems;
   b) using a plurality of grow tub liners fitted with grow lids, with each grow lid having voids sufficient for allowing plant life to grow through the grow lid voids;
   c) using a pipe system to deliver water to the plurality of grow tub liners;
   d) using an overflow drain system comprising a lower drain section and an upper drain section, with the upper drain section superior to the lower drain section such that plant roots—contained within the grow tub liners are exposed to air and move upon use of upper drain section;
   e) using a lighting system providing artificial light to one or more of the grow tub liners;
   f) using a filtration system filtering drained water and returning water for delivery to the grow tub liners; and
   g) using a side reflector system, contained within the racking systems, the light reflector system allowing visual inspection of lighting components.

7. The method of claim 6 using a closed structure to protect plants from outside elements.

8. The method of claim 7 using an air shower to clean people who enter the closed structure.

9. The method of claim 8 using clean suits to clothe people who enter the closed structure.

* * * * *